Figure 1:
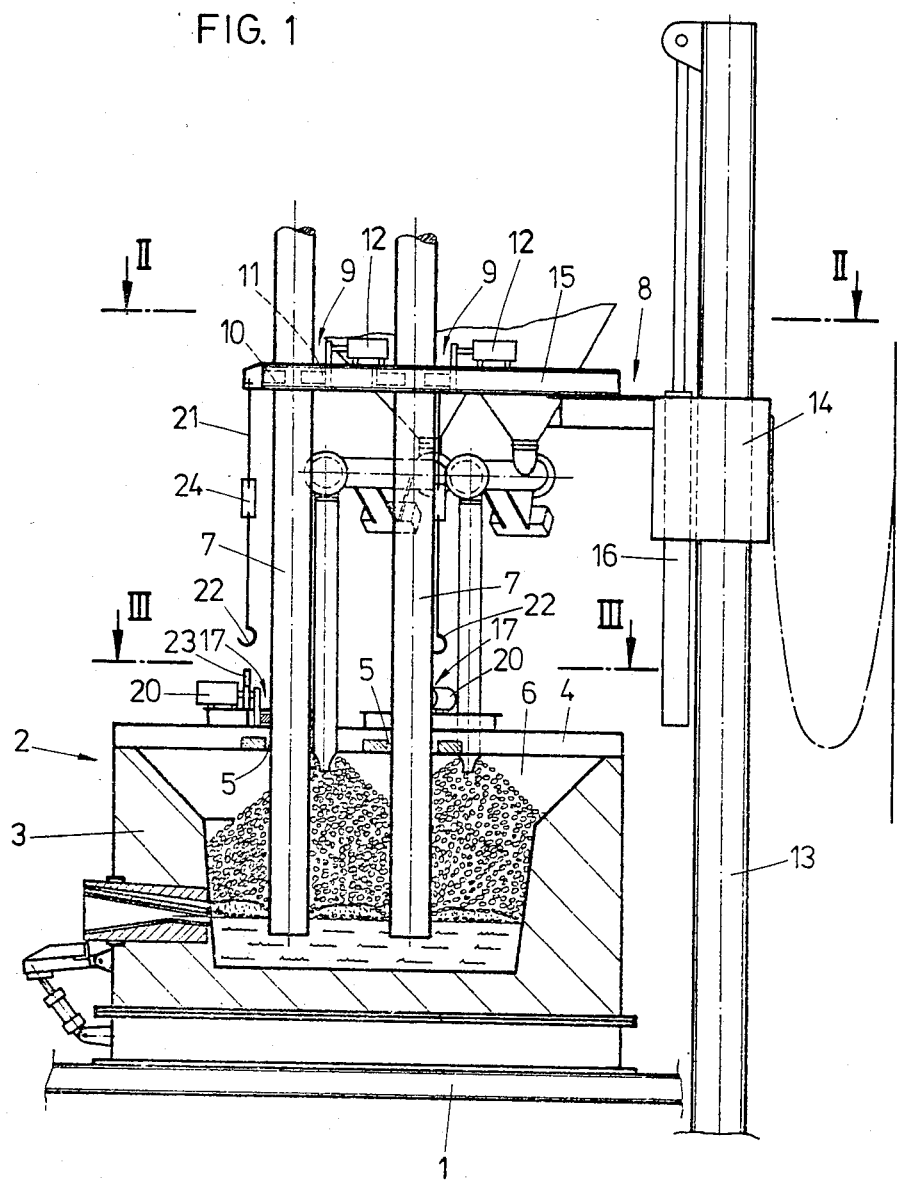

United States Patent [19]

Enkner et al.

[11] Patent Number: 4,617,672
[45] Date of Patent: Oct. 14, 1986

[54] ELECTRIC FURNACE ARRANGEMENT

[75] Inventors: Bernhard Enkner; Leopold Amon, both of Linz; Alfred Kübelböck, Zwettl/Rodl; Wolfgang Trimmel, Leoben; Paul Nalepka, Niklasdorf; Leopold Schropp, Linz; Helmut Schwaighofer, Neumarkt; Reinhard Pum, Linz; Manfred Traxler, Hart; Franz Tasch, Bad Mitterndorf, all of Austria

[73] Assignee: Voest-Alpine Aktiengesellschaft, Linz, Austria

[21] Appl. No.: 775,538

[22] Filed: Sep. 13, 1985

[30] Foreign Application Priority Data

Sep. 18, 1984 [AT] Austria ............................ 2963/84

[51] Int. Cl.$^4$ ............................................. H05B 7/00
[52] U.S. Cl. ......................................... 373/79; 373/73; 373/81; 373/98; 373/99
[58] Field of Search ...................... 373/94, 98, 99, 73, 373/100, 60, 71

[56] References Cited

U.S. PATENT DOCUMENTS

| 3,404,209 | 10/1968 | Brooke | 373/81 |
| 3,428,301 | 2/1969 | Chermely | 373/73 X |
| 4,140,867 | 2/1979 | Wynne | 373/99 |
| 4,455,660 | 6/1984 | Buhler | 373/81 |

Primary Examiner—Roy N. Envall, Jr.
Attorney, Agent, or Firm—Hopgood, Calimafde, Kalil, Blaustein & Judlowe

[57] ABSTRACT

Electric furnace arrangement including a furnace vessel with liftable and lowerable lid penetrated by at least one electrode. The electrode is fastened to a liftable and lowerable supporting construction by first clamping devices. For lifting the lid, a further clamping device for the electrode is provided on the lid, at least one coupling element is provided on the supporting construction and at least one counter-coupling element is arranged on the lid, which can be brought into and out of engagement with the coupling element. A connecting element can be provided between coupling element and supporting construction.

4 Claims, 6 Drawing Figures

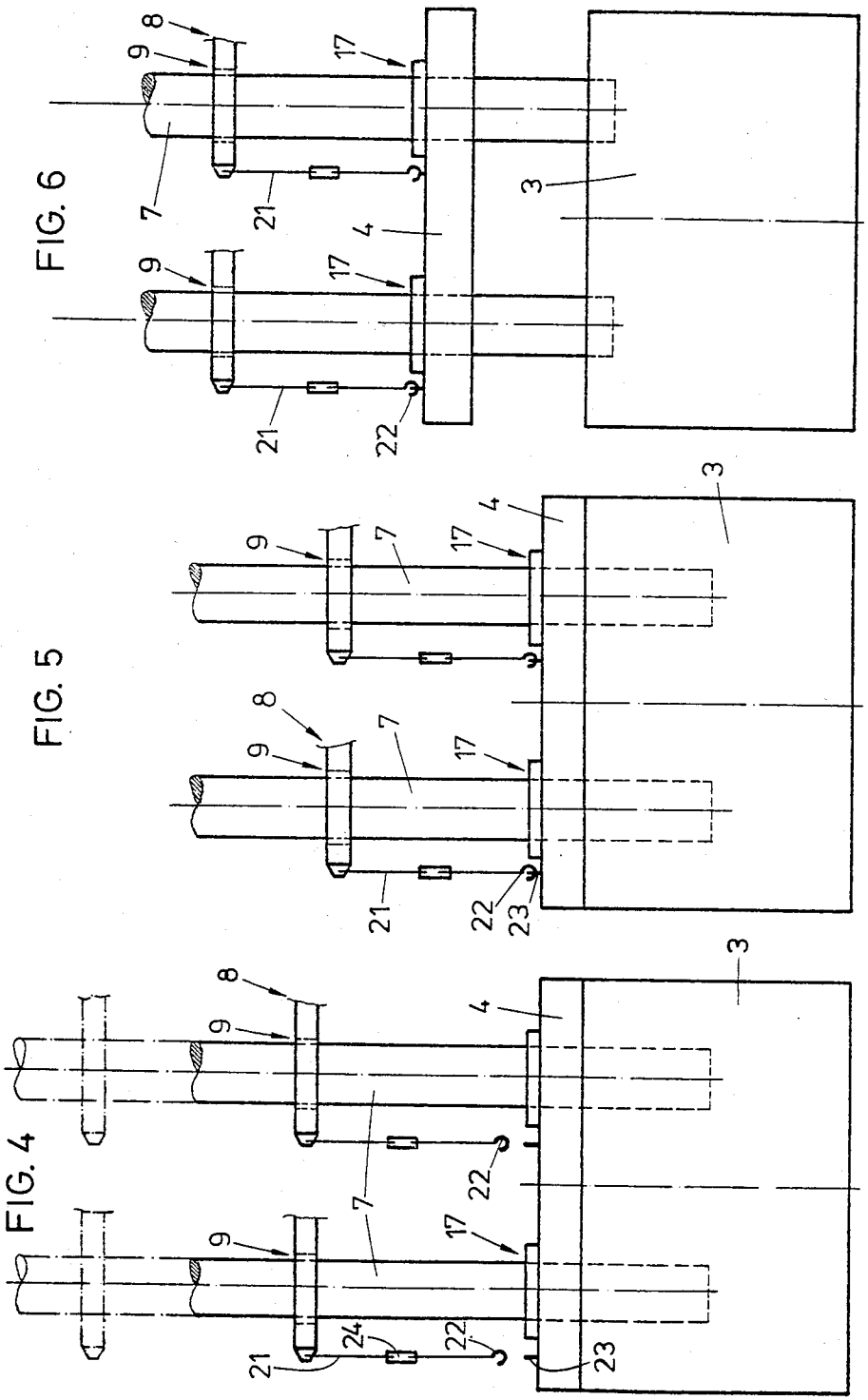

ELECTRIC FURNACE ARRANGEMENT

The invention relates to an arrangement at an electric furnace which includes a furnace vessel that is adapted to be closed by a liftable and lowerable lid and at least one electrode penetrating through said lid into said furnace vessel, said electrode being adapted to be fastened by means of a clamping device to a liftable and lowerable supporting construction rising above said electric furnace.

An electric furnace including a liftable and lowerable lid and liftable and lowerable electrodes penetrating the lid is known from U.S. Pat. No. 2,469,740. In this known arrangement the lid of the furnace vessel is held by a separate carrying structure, which is liftable and lowerable by means of a separate lifting means independent of the carrying structure for the electrodes, which constitutes a highly complex construction.

From German Auslegeschrift No. 1,216,900 an arrangement for an electric furnace of the initially defined kind is known, which permits coupling of a lid carrying structure to an electrode carrying structure, so that the lifting means actuating the electrode carrying structure can also be used for lifting the lid carrying structure and, thus, the lid. This construction has, however, the disadvantage of employing two carrying structures, i.e. one for the lid and a further one for the electrode. The two carrying structures require separate guiding elements and supporting means for providing support in the inoperative position, which further enhances the complexity of the construction. Moreover, the lifting means must be strongly dimensioned, as it has to actuate, apart from the lid and the electrodes, both the lid carrying structure and the electrode carrying structure.

The invention aims at avoiding these disadvantages and difficulties and has as its object to provide an arrangement for an electric furnace of the above defined kind, in which the lifting means for lifting and lowering the electrodes is adapted to also lift and lower the lid, while doing without an additional lid carrying means.

In accordance with the invention, this object is achieved in that—for lifting the lid—a further clamping device for the electrode is arranged at the lid aperture where the electrode penetrates the lid, and at least one coupling element is arranged at the supporting construction, which coupling element is adapted to engage with and disengage from at least one counter-coupling element fastened to the lid.

An embodiment of a particularly simple construction is characterized in that the coupling element is fastened to the lower end of a connecting element, such as a rope, a chain, a rod or a bracket, that accommodates tensile forces and that is fastened to the supporting construction with its upper end, said coupling element being designed as a hook or an eye.

For ease of manipulation it is advantageous that the connecting element is adjustable in length.

Figure 2:
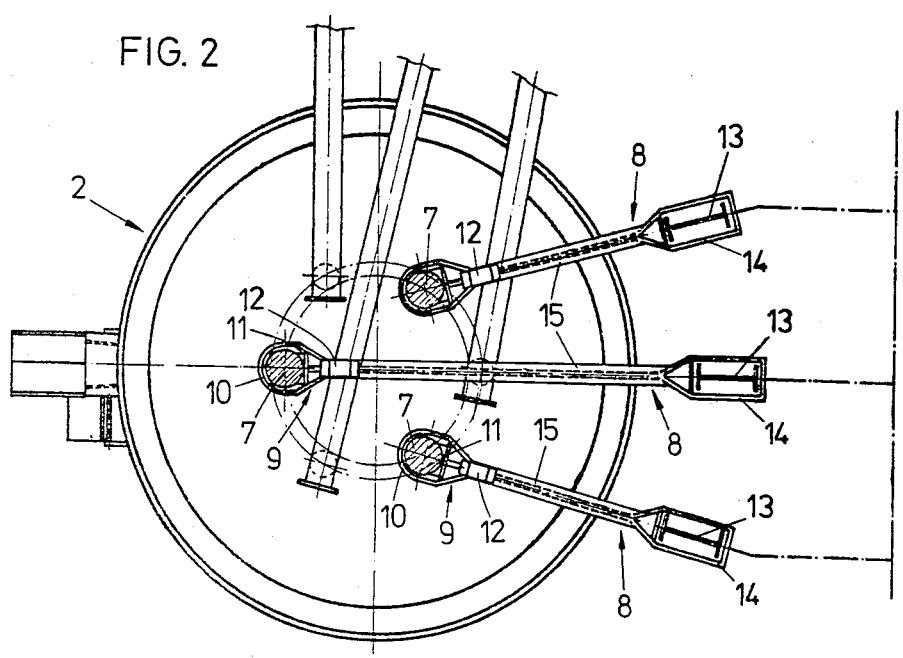
Figure 3:
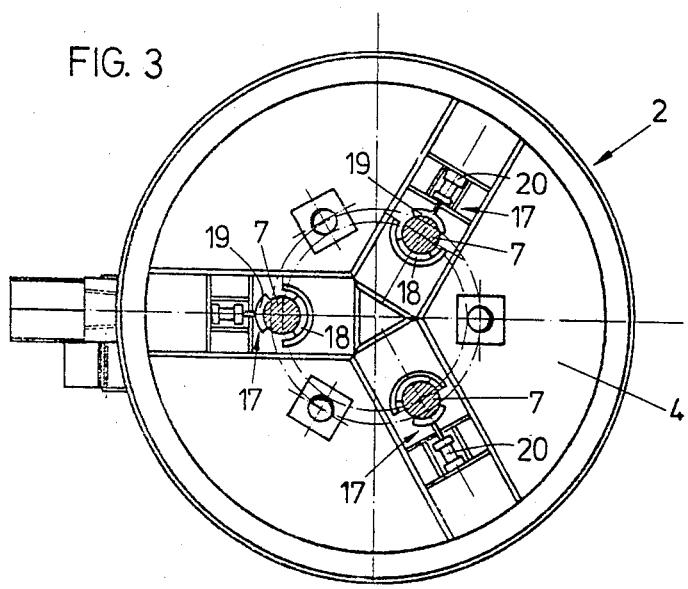

The invention will now be described by way of one embodiment in connection with the accompanying drawings, wherein FIG. 1 is a section through an electric furnace in schematic illustration, FIGS. 2 and 3 show sections along the lines II—II and III—III of FIG. 1, and FIGS. 4 to 6 illustrate the functioning of the arrangement of the present invention by way of an electric furnace shown in side view.

A stationary stand 1, not illustrated in greater detail, carries the electric furnace 2, which comprises a refractorily lined furnace vessel 3 and a lid 4 closing the furnace vessel 3. The lid is provided with penetration apertures 5 for electrodes 7 projecting into the inner cavity 6 of the furnace vessel 3, which electrodes penetrate through said penetration apertures 5 of the lid 4 when in the operating position. The electrodes 7 are each adapted to be fastened at different height levels to a liftable and lowerable carrying construction 8 by means of clamping devices 9.

The clamping devices are each formed by a half-ring 10 surrounding the electrode 7, adjusting means 11, actuatable by a pressure medium cylinder 12, being provided to press the electrode 7 against the half-ring.

Each supporting construction 8 is formed by a sledge 14 movable along a vertical upright 13, a cantilever girder 15 extending above the electric furnace and reaching to the respective electrode 7 being mounted on said sledge. A lifting means 16 serves for lifting and lowering the sledge along the vertical upright 13, which lifting means may, for instance, be formed by a pressure medium cylinder. In the example shown, the supporting constructions 8 of the three electrodes 7 are liftable and lowerable both synchronously and individually.

At the penetration apertures 5 for the electrodes 7 provided on the lid 4, further clamping devices 17 are arranged, which are each formed by tongue-like jaws 18, 19 adapted to the electrode cross-section, each jaw being movable toward and away from the electrode 7 by means of a pressure medium cylinder 20.

A tensile-force accommodating connecting element 21 is mounted to each supporting construction 8 of the electrodes 7, the lower end of which connecting element is provided with a hook 22. Below each hook an eye 23 fastened to the lid 4 is provided.

Preferably, the connecting elements 21 are designed as length-adjustable rods, length-adjustment being effected by a turnbuckle 24 each.

The arrangement of the present invention functions as follows when lifting and lowering the lid 4.

For lifting the lid, the clamping devices 17 for the electrodes arranged on the lid 4 are tensioned and the clamping devices 9 arranged on the supporting constructions 8 are disengaged from the electrodes 7 (FIG. 4). Thereafter, the supporting constructions 8 are synchronously lowered so far that the hooks of the connecting elements 21 can be engaged in the eyes 23 of the lid 4, see FIG. 5. Thereafter, the supporting constructions 8 can synchronously be lifted from the furnace vessel 3, carrying along the lid 4 and the electrodes 7, as shown in FIG. 6.

Placing of the lid 4 onto the furnace vessel 3 takes place vice versa, in that at first the clamping devices 9 on the supporting constructions 8 are released and the clamping devices 17 provided on the lid are tensioned. The supporting constructions 8 are synchronously lowered into the position shown in FIG. 5, whereupon the hooks 22 are disengaged from the eyes 23 and the supporting constructions 8 can again be lifted into the desired position.

Subsequently, the clamping devices 9 provided on the supporting constructions 8 are tensioned and the clamping devices 17 provided on the lid 4 are released, so that the electrodes 7 can be lowered into the furnace cavity 6 with the help of the supporting constructions 8, for achieving a constant depth of immersion in accordance with the speed of consumption.

It is the purpose of the turnbuckles 24 to compensate for possibly present differences the lengths of the connecting elements 21 and to hold the lid 4 in an exactly horizontal position.

The invention is not limited to the embodiment shown, but can be modified in various aspects. Thus, it is possible to arrange all of the electrodes on a single liftable and lowerable supporting construction common to all the electrodes. Moreover, the invention can be practized in electric furnaces having any desired number of electrodes.

What we claim is:

1. In an electric furnace arrangement of the type including a furnace vessel, a liftable and lowerable lid having at least one aperture and adapted to cover said furnace vessel, at least one electrode adapted to penetrate through the aperture in said lid into said furnace vessel, a liftable and lowerable supporting construction extending above said electric furnace and adapted to carry said electrode, and first clamping means adapted to fasten said electrode to said supporting construction, the improvement comprising second clamping means for said electrode arranged adjacent said aperture in said lid, at least one coupling element arranged on said supporting construction and at least one countercoupling element fastened to said lid, said coupling element being adapted to be brought into and out of engagement with said countercoupling element, to permit lifting of said lid.

2. An electric furnace arrangement as set forth in claim 1, further comprising a tensile-force accommodating connecting element extending between a lower end and an upper end thereof, said lower end being fastened to said coupling element, which comprises one of a hook and an eye and said upper end being fastened on said supporting construction.

3. An electric furnace arrangement as set forth in claim 2, wherein said tensile-force accommodating connecting element is selected from the group consisting of a rope, a chain, a rod and a bracket.

4. An electric furnace arrangement as set forth in claim 2 or 3, wherein said connecting element is adjustable in length.

* * * * *